United States Patent [19]
Freymark et al.

[11] Patent Number: 6,106,730
[45] Date of Patent: Aug. 22, 2000

[54] PROCESS FOR INHIBITING THE SETTLEMENT OF POST-VELIGER ZEBRA MUSSELS

[75] Inventors: Scott G. Freymark, Wheaton; Lawrence C. Hale, Homewood, both of Ill.

[73] Assignee: Ashland Inc., Columbus, Ohio

[21] Appl. No.: 08/841,087

[22] Filed: Apr. 29, 1997

Related U.S. Application Data

[63] Continuation of application No. 08/521,643, Aug. 31, 1995, abandoned.

[51] Int. Cl.$^7$ .................................. C02F 1/50; C02F 1/76
[52] U.S. Cl. ............................................ 210/754; 210/764
[58] Field of Search ........................... 210/754, 764

[56] References Cited

U.S. PATENT DOCUMENTS

| | | | |
|---|---|---|---|
| 5,256,310 | 10/1993 | Brooks | 210/747 |
| 5,468,739 | 11/1995 | Whitekettle et al. | 210/764 |
| 5,520,821 | 5/1996 | Screptock et al. | 210/754 |

OTHER PUBLICATIONS

Chemical Oxidants for Controlling Zebra Mussels (*Dreissena polymorpha*): A Synthesis of Recent Laboratory and Field Studies, John E. Van Benschoten, et al, Chapter 35, pp. 599–618 1991 by Lewis Publishers.

AWWA Zebra Mussel Research Project Results, Peter C. Fraleigh, Associate Professor of Biology, University of Toledo, Toledo, Ohio 43606, et al pp. 103–117.

Examination of the Potential of Chorine Dioxide for Use in Zebra Mussel Vegliger Control, Linda Rusznak, et al, Ashland Chemical Company, Drew Industrial Division, 1995 Ashland Inc.

Chlorine Dioxide—An Oxidizing Agent For Water Disinfection And Zebra Mussel Control, Linda H. Rusznak, et al, Drew Industrial Division, Ashland Chemical Company, Division of Ashland Oil, Inc., 1994.

Chlorine Dioxide—A Molluscicidal Agent For Adult Zebra Mussel Eradication, Linda H. Rusznak, et al, Drew Industrial Division, Ashland Chemical Company, Division of Ashland Oil, Inc., 1994.

*Primary Examiner*—Neil McCarthy
*Attorney, Agent, or Firm*—David L. Hedden

[57] ABSTRACT

This invention relates to an intermittent process for inhibiting the settlement of zebra mussels in the post-veliger state in addition to providing infestation control of zebra mussels in the veliger state. The process comprises (a) connecting a chlorine dioxide generator to an entry means, such as a water intake pipe or reservoir, of a flowing aqueous system containing a population of zebra mussel veligers and post-veligers, (b) pumping specified amounts of chlorine dioxide into said aqueous system.

7 Claims, 1 Drawing Sheet

PROCESS FOR INHIBITING THE SETTLEMENT OF POST-VELIGER ZEBRA MUSSELS

This application is a continuation of application Ser. No. 08/521,643, filed on Aug. 31, 1995 abandoned.

FIELD OF THE INVENTION

This invention relates to an intermittent process for inhibiting the settlement of zebra mussels in the post-veliger state in addition to providing infestation control of zebra mussels in the veliger state. The process comprises (a) connecting a chlorine dioxide generator to an entry means, such as a water intake or reservoir, of a flowing aqueous system containing a population of zebra mussel veligers and post-veligers, (b) adding specified amounts of chlorine dioxide into said aqueous system (c) maintaining a specified concentration of chlorine dioxide in said aqueous system for a specified time.

BACKGROUND OF THE INVENTION

Zebra mussels are rapidly colonizing the Great Lakes and are spreading throughout the fresh waters of North America. The rate of colonization is dependent upon the reproduction of zebra mussel veligers. Veligers are the microscopic, free-swimming larvae of adult zebra mussels produced by the eggs of female zebra mussels which are fertilized outside the shell and hatch.

Since veligers are capable of actively swimming for 1 to 2 weeks, the population of the veligers can be dispersed over considerable distances from parent colonies. Within 3 weeks of hatching, the veligers reach the beginning of the settling stage. At this stage the veligers are referred to as "post-veligers". During this time, the post-veliger has developed a foot which allows crawling to aid the post-veliger as it searches for a hard substrate such as rock, metal, wood, plastic, vinyl, glass, rubber, or in some cases plant life, etc. to which they can attach. After attachment, the post-veligers continue metamorphosis and are transformed into a shelled adult zebra mussel having a size typically ranging from 1.0 to 1.5 inches in length.

The adult zebra mussel may remain attached to the substrate throughout their life by byssal threads produced by a gland in the mussel. Depending upon the environment, zebra mussels have an average life span of 3.5 years and in some cases 5 years. Overpopulation of zebra mussels causes severe macrofouling of water supplies and reduction of plankton which other aquatic life uses for food. Another major concern is the clogging of pipes or process equipment, which can lead to efficiency loss, in industrial plants which can occur if zebra mussels attach to the inside of intake pipes, heat exchangers, screens, and other components through which water flows.

It is known to kill adult zebra mussels with chlorine dioxide by a continuous process. "Continuous" means the chlorine dioxide is fed into the aqueous system twenty-four hours daily, or substantially for 24 hours daily. In the continuous process, typically a free residue of from 0.1 ppm to 0.5 ppm of chlorine dioxide is continuously fed into a population of adult zebra mussel. In this continuous process, all of the water entering the system is treated with chlorine dioxide.

SUMMARY OF THE INVENTION

This invention relates to an intermittent process for inhibiting the settlement of zebra mussels in the post-veliger state and providing infestation control of zebra mussels in the veliger state which comprises:

(a) connecting a chlorine dioxide generator to an entry means, such as a water intake or reservoir, of a flowing aqueous system where said aqueous system contains zebra mussel veligers and post-veligers; and (b) pumping chlorine dioxide into said aqueous system in amount sufficient to obtain and maintain a chlorine dioxide concentration of 0.1 ppm to 0.5 ppm for a period of 10 minutes to 120 minutes.

Preferably the process is carried out 4 days to 7 days per week during the spawning season of the zebra mussels which is typically between April and October. Preferably the process is carried out automatically using a timer or means to monitor oxidation/reduction potential (ORP) to begin and end the flow of chlorine dioxide from the generator, and a controller which senses and adjusts the rate of chlorine dioxide feed.

By inhibiting the settlement of post-veligers, the population of adult zebra mussel veliger is effectively controlled and maintained at a desirable level. The process controls the population of post-veligers without subjecting the environment to excessive doses of chlorine dioxide over shorter time intervals. As a result the process is less of a threat to other aquatic life and may not require expensive dechlorination.

The concentration of chlorine dioxide and the intervals for dosing used in the process are surprising. High concentrations of chlorine dioxide are not needed over long time intervals. This reduces the environmental and economic impact of the process. This is surprising because the process only treats less than 50%, preferably less than 30%, and most preferably less than 10% or 5% of the system water per day. It is further surprising because one assumes more toxic doses of chlorine dioxide are needed to control the population of the mobile post-veligers. The process can reduce and maintain post veliger populations to less than 2000 post-veligers/m$^2$, or even less than 600 post-veligers/m$^2$.

BRIEF DESCRIPTION OF FIGURE

The Figure is a flow chart showing the process used in determining the effects of treating post-veligers with chlorine dioxide.

DETAILED DESCRIPTION OF FIGURE

Figure 1:
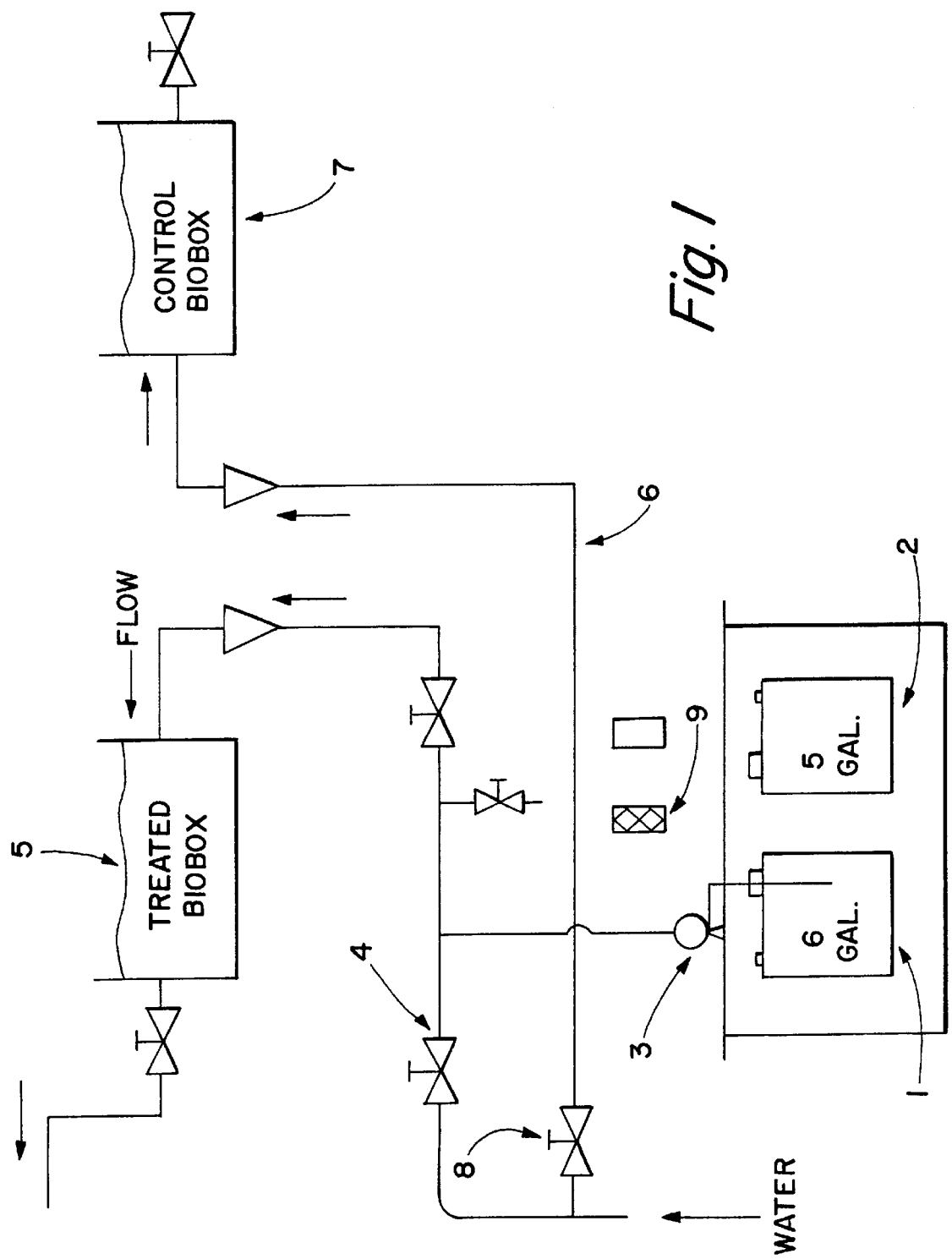

The Figure shows the procedure used in the examples to determine the effect of chlorine dioxide in inhibiting the settlement of veligers. The water containing the veligers was treated intermittently with a chlorine dioxide solution 1 prepared in the laboratory. The chlorine dioxide solution was stored in a reservoir 2 and transported by a pump 3 to an intake line 4 which was directed to a treated biobox 5. A parallel, untreated stream 6 flowed into a Control biobox 7 which was not treated with chlorine dioxide. Valves 8 are used to regulate the flow of the aqueous system and a timer 9 energized the pump so the chlorine dioxide could be fed intermittently.

DEFINITIONS

| | |
|---|---|
| zebra mussel = | An adult zebra mussel with a hard shell having a size typically ranging from 1.0 to 1.5 inches in diameter which is immobile and attached to a substrate. |

-continued

DEFINITIONS

| | |
|---|---|
| zebra mussel veliger = | Veligers are the microscopic, free-swimming larvae of adult zebra mussels produced by the eggs of female zebra mussels which are fertilized outside of the shell and hatch. |
| zebra mussel post-veliger = | Post-veligers are between the larval stage and adultstage. The post-veliger is mobile, but is developing a shell. It is searching for a substrate to which is can attach and grow into an adult zebra mussel. |
| intermittent feed = | A process for feeding chlorine dioxide to an aqueous system for a specified time period and then stopping for a specified time period during a 24 hour time period. The time period for feeding and stopping may vary from one feeding to another. The number of feedings can vary from one day to the next. Intermittent feeding is in contrast to continuous feeding which is typically carried out 24 hours per day, or substantially for 24 hours per day. |
| inhibition of settlement = | The process of preventing post-veliger attachment to a substrate thereby not allowing the post-veliger to continue growing into an adult zebra mussel. |

Enabling Disclosure and Best Mode

Any effective method of preparing chlorine dioxide can be used. Typical methods of generating chlorine dioxide are:

A. The "acid generation method" or "hypochlorite generation method" is chemically described as follows:

$$NaOCl + 2HCl + 2NaClO_2 \rightarrow 2ClO_2 + 3NaCl + H_2O$$

B. The "chlorine generation method" chemically described as follows:

$$2NaClO_2 + Cl_2 \rightarrow 2ClO_2 + 2NaCl$$

Particularly useful are the chlorine dioxide generation method and equipment described in U.S. Pat. Nos. 4,013,761; 4,147,115; 4,143,115; 4,247,531; 4,013,761; 4,590,057; 5,004,696; 5,104,527; 5,258,171; and 5,227,306, all of which are incorporated herein by reference.

Any chlorine dioxide generator can be used to pump chlorine dioxide into the entry means, such as a pipe, of an aqueous system. Particular chlorine dioxide generators are described in the patents previously mentioned. Preferably the chlorine dioxide generator is connected to a water intake of a lake, or river water, or a reservoir. The intake means is preferably upstream from the point of discharge. The population of the post-veligers in the stream to be treated is not critical. Typically the population of veligers during the season ranges from 10 per liter to 250 per liter. The population of the post veligers can be determined by placing settling slides in bioboxes which are submerged in the system. An examination of the slides indicate their rate of settling expressed in m². Typical settling rates during the season can be in range of 100 per m² to 5000 per m².

The chlorine dioxide is pumped into the aqueous system in an amount sufficient to obtain and maintain a chlorine dioxide concentration of 0.1 ppm to 0.5 ppm, preferably 0.2 ppm to 0.3 ppm, most preferably 0.25 ppm. The time for pumping chlorine dioxide into the aqueous stream at one feeding will depend upon many factors. However, in general the chlorine dioxide is preferably pumped into the aqueous system for a period of 10 minutes to 120 minutes, or for a period of 10 minutes to 60 minutes, during one feeding. Preferably the time for pumping chlorine dioxide can be as little as 10 minutes to 30 minutes, most preferably for 10 minutes to 15 minutes during one feeding.

The addition of the chlorine dioxide to the aqueous system is preferably added every 2 hours to 12 hours daily at least two times per day, preferably every 4 to 6 hours four times daily. The process is carried out at least 5 days to 7 days per week during the spawning season of the zebra mussels which is typically between April and October, preferably 7 days per week.

Preferably the process is carried out automatically using a timer to begin and end the flow of chlorine dioxide from the generator, and a controller which senses and adjusts the rate of chlorine dioxide feed. Alternatively, the process can be automated by calibrating and using an oxidation/reduction potential monitor.

EXAMPLES

The test site used in the examples was a power plant on the Eastern shores of Lake Michigan where post-veligers were settling. The plant experienced clogged pipes and equipment when post-veligers attached to the inside of the pipes and grew into adult zebra mussels. The post-veliger densities entering the plant were monitored throughout the spawning season. In 1994, the veliger density ranged from 0 to 514,000 per m³. Veligers can be measured by filtering several hundred gallons of water through a 60 micron mesh net approximately and viewing the filtrate under a microscope, or post-veligers can be measured by using settling plates to measure the density (post-veligers/m²) of post-veliger settlers in a water source for a period of time expressed.

The Figure shows the procedure used to determine the effect of chlorine dioxide in inhibiting the settlement of veligers. The water containing the veligers was treated intermittently with a chlorine dioxide solution 1 prepared in the laboratory. The chlorine dioxide solution was stored in a reservoir 2 and transported by a pump 3 to an intake line 4 which was directed to a treated biobox 5. A parallel, untreated stream 6 flowed into a Control biobox 7 which was not treated with chlorine dioxide. Valves 8 are used to regulate the flow of the aqueous system and a timer 9 energized the pump so the chlorine dioxide could be fed intermittently. The chlorine dioxide was prepared by the following reaction:

$$NaOCl + 2HCl + 2NaClO_2 \rightarrow 2ClO_2 + 3NaCl + H_2O.$$

The treatment level of chlorine dioxide was 0.25 ppm above the oxidant demand of the river water and it was fed for a period of 15 minutes four times per day at 6 hour intervals. The oxidant demand of the raw lake water used was about 0.1 ppm.

The bioboxes each contained two rows of seven plastic coupons measuring 4.5×4.5 inches. Water was piped into the bioboxes directly from the plant's intake forebay via a well pump. Over three weeks, randomly selected coupons were removed for analysis from both the control and treated bioboxes and the veligers were counted by viewing the slides under a microscope.

TABLE I

Average Post-Veliger Count (Number/m$^2$) When Chlorine Dioxide was Introduced at 0.25 mg/l Residual for 15 Minutes, 4 Times Daily

| WEEKS EXPOSED | TREATED | CONTROL | % INHIBITION |
|---|---|---|---|
| 1 | 403 | 4587 | 91 |
| 2 | 227 | 11846 | 98 |
| 2 | 504 | 4663 | 89 |
| 4 | 1068 | 20851 | 95 |
| MEAN | 551 | 7032 | 95 |

The results in Table I indicate that chlorine dioxide, fed at a rate of 0.25 ppm above the oxidant demand of the raw water system for 15 minutes duration four times per week, inhibited settlement of post-veligers by 95% compared to the untreated system and successfully limited post-veliger mean population densities to less than 600 individuals/m$^2$, even though the chlorine dioxide was applied intermittently to less than 5% of the total water stream and the post-veligers were mobile.

This result is particularly surprising in view of static tests using chlorine dioxide to kill zebra mussel veligers. Static testing was performed by treating a test volume of filtered river water (approximately 500 ml), which was free of zebra mussel veligers as well as the plankton, with dose level of chlorine dioxide. Dose levels ranged from 0.75 ppm to 5.0 ppm. Veligers were filtered from untreated river water and transferred to the chlorine dioxide treated water previously described. Contact times ranged from 5 minutes to 60 minutes. After exposure, the veligers were removed from the chlorine dioxide treated water and rinsed to remove chemical residual from the veligers. The veligers were again suspended in filtered untreated river water and placed on a plankton wheel. A plankton wheel enables the biologist to view organisms microscopically by being able to make observations of the organism moving freely through a water habitat. The effects of chlorine dioxide on the veligers were observed and scored using a rating system to determine veliger mortality. The test results are set forth in Table II which follows.

TABLE II

Veliger Mortality Caused by Chlorine Dioxide Treatment

| DOSAGE | CONTACT | % VELIGER KILL |
|---|---|---|
| 0.75 ppm | 5 Minutes | 16% |
| 0.75 ppm | 30 Minutes | 21% |
| 0.75 ppm | 60 Minutes | 42% |
| 2.0 ppm | 30 Minutes | 30% |
| 5.0 ppm | 30 Minutes | 38% |
| Control |  | 9% |

In view of these the results shown in Table II, based on static tests which show the relative ineffectiveness of killing zebra mussels with chlorine dioxide (even at higher dosages and for more extended time), it is surprising that feeding chlorine dioxide intermittently to a flowing aqueous system containing veligers and mobile post veligers was effective in inhibiting the settlement of zebra mussels post veligers. Evidently, chlorine dioxide provides a behavioral, as well as life process disorientation, which effectively controls veliger contamination in systems treated with chlorine dioxide.

We claim:

1. An intermittent process for inhibiting the settlement of zebra mussels in the post-veliger state and providing infestation control of zebra mussels in the veliger state which comprises (a) connecting a chlorine dioxide generator to an entry means of a flowing aqueous system where said aqueous system contains zebra mussel veligers and post-veligers; and (b) feeding chlorine dioxide from said chlorine dioxide generator to said aqueous system in an amount sufficient to obtain and maintain a chlorine dioxide concentration of 0.1 ppm to 0.5 ppm for a period of 10 minutes to 120 minutes, (1) the amount of water treated per feeding is less than 30% of the total water circulated daily;

(2) said process is carried out 4 days to 7 days per week each week during the season of zebra mussel spawning;

(3) the chlorine dioxide is fed to the flowing aqueous system every 2 hours to 12 hours per day at least two times per day.

2. The process of claim 1 wherein said process is carried out 5 days to 7 days per week during the season of zebra mussel spawning.

3. The process of claim 2 wherein the amount of water treated per feeding is less than 10% of the total water circulated daily.

4. The process of claim 1 wherein the entry means is a water intake or a reservoir.

5. The process of claim 2 where the chlorine dioxide is fed to the aqueous system every 2 hours to 6 hours per day at least three times per day.

6. The process of claim 4 wherein the timing, dosage, and frequency of the for the addition of the chlorine dioxide is automatically controlled.

7. The process of claim 5 wherein the population of post-veligers reduce to and maintained at a level of less 2000 post-veligers/m$^2$.

* * * * *